H. B. LEVINSON AND W. H WESTFALL.
TRAILER TRUCK.
APPLICATION FILED MAR. 16, 1918.
1,327,338.
Patented Jan. 6, 1920.
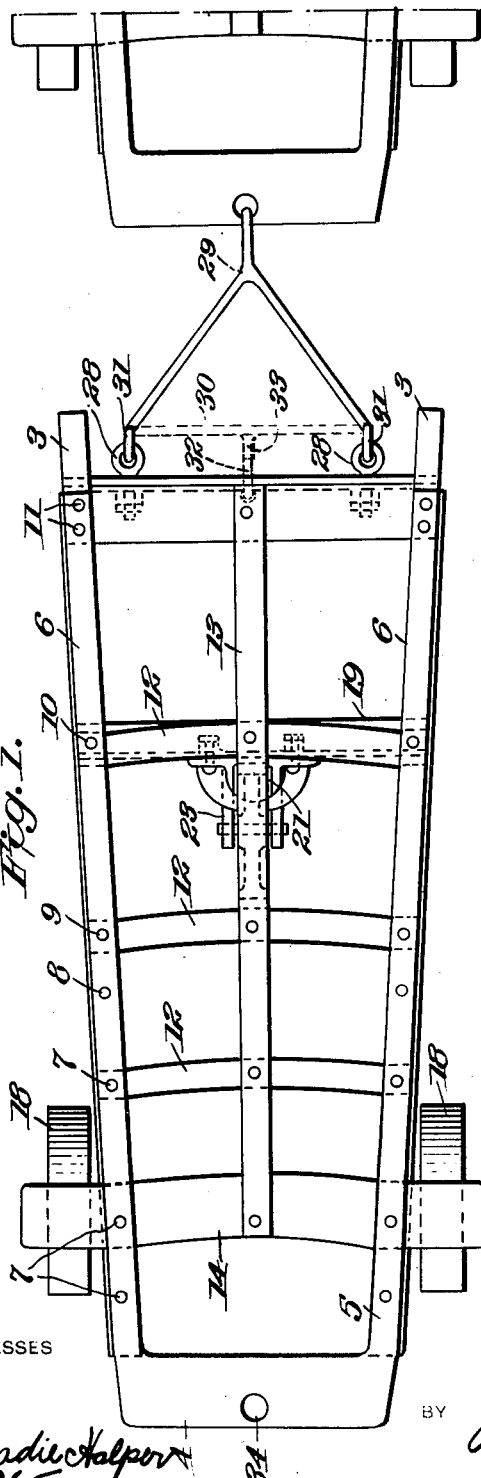
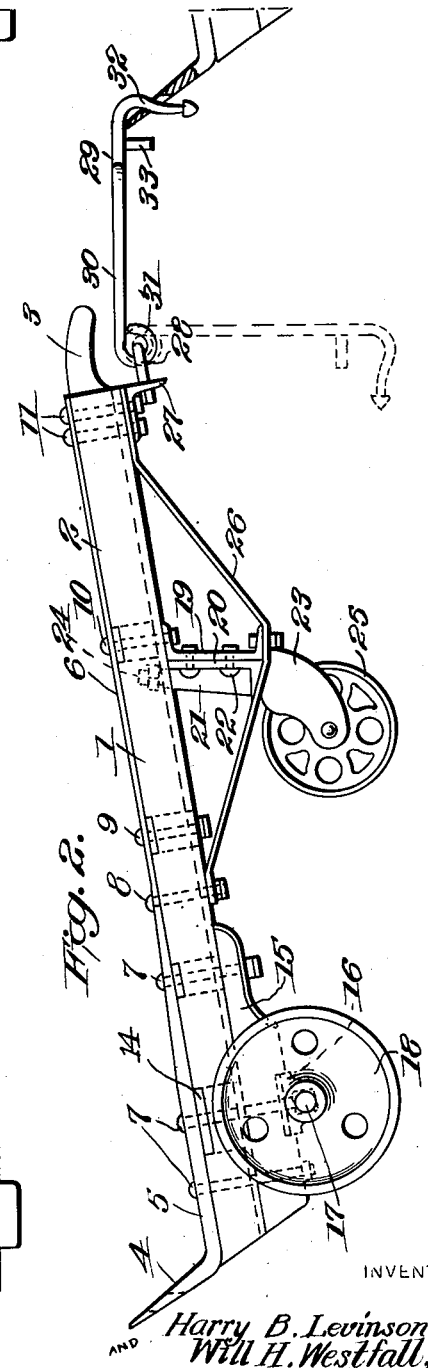
INVENTORS,
Harry B. Levinson
AND Will H. Westfall,
WITNESSES
BY
ATTORNEY.

UNITED STATES PATENT OFFICE.

HARRY B. LEVINSON, OF BROOKLYN, NEW YORK, AND WILL H. WESTFALL, OF RUTHERFORD, NEW JERSEY.

TRAILER-TRUCK.

1,327,338.   Specification of Letters Patent.   Patented Jan. 6, 1920.

Application filed March 16, 1918. Serial No. 222,891.

*To all whom it may concern:*

Be it known that we, HARRY B. LEVINSON and WILL H. WESTFALL, citizens of the United States, residing at Brooklyn, in the county of Kings and State of New York, and Rutherford, in the county of Bergen and State of New Jersey, respectively, have invented certain new and useful Improvements in Trailer-Trucks, of which the following is a specification.

This invention is a truck and has special reference to a combined stevedore and trailer truck.

One object of this invention is the production of a truck which will facilitate the positioning of a load thereon in the usual manner in which an ordinary stevedore truck operates by the insertion of the lip under the element to be positioned thereon and then the tilting of the truck to an inclined position to cause the elements to then fit upon the truck, and under such condition permitting a man to grip the handle of the truck and move the same freely.

Another object of this invention is the production of a combined hand truck and trailer truck, since it is provided with a swivel steering wheel carried upon the frame and adjacent the handles thereof, thus permitting the wheels to fit upon a support for permitting of the transporting of the truck when power is applied thereto.

Another object of this invention is the production of a combined stevedore and trailer truck, which is provided with an efficient connecting means at either end thereof, thus permitting a number of the trucks to be connected together to form a train, to which motive power may be applied for transporting the same without difficulty.

A still further object of this invention is the production of a truck as above specified, wherein it is reinforced so as to present a very strong structure, although the parts are so arranged as to minimize the weight of the device and the expense thereof in production or manufacture.

With these and other objects in view, this invention consists of certain novel combinations, constructions, and arrangement of parts as will be hereinafter fully described and claimed.

One practical form of construction and assembly of the present invention will be hereinafter described and is illustrated in the accompanying drawing, in which—

Figure 1 is a top plan view of the truck as constructed in accordance with the present invention, a portion of one end of another truck being shown in fragmentary top plan view, the trucks being disconnected.

Fig. 2 is a side elevation of the truck showing the same connected to the end of a truck in front, the front truck being shown in fragmentary side elevation.

Referring to the accompanying drawing by numerals, it will be seen that the truck includes the spaced side beams 1, which are reinforced by having angle irons 2, positioned thereupon and fitting under the lower surface thereof. The handles 3 extend from the side beams 1, as illustrated clearly in Figs. 1 and 2 of the drawing. It is of course obvious that if so desired, any form of angle iron, or beam may be employed for the side beams of the truck, under such condition the beams 1 being eliminated.

The lip 4 has a pair of thickened bodies 5 extending therefrom at oblique angles and it will be noted, by referring particularly to Fig. 2 that these bodies 5 taper toward their rear ends to form elongated extensions 6, which fit upon the upper surfaces of the beams 1.

It will be noted that bolts 7 are projected through the body of the lip 4 and also through the beams 1 and the angle irons 2, thus holding these elements in engagement with each other and also performing certain other functions as will be hereinafter presented. Certain other bolts 8, 9, 10 and 11 are passed through the extensions 6 of the body 5 of the lip 4 and also through the beams 1 and the angle iron 2 for retaining these elements upon each other in a set position and certain of these last mentioned bolts also perform other functions, which will be hereinafter presented.

By referring particularly to Fig. 1 it will be noted that transversely extending ribs 12 are interposed between the side beam 1 and are held in engagement therewith by means of the bolts 7, 9, 10 and 11. The central longitudinally extending rib 13 engages the central portions of the ribs 12 and also is connected to the transversely extending bar 14 carried under the bodies 5 of the lip 4 and projecting for considerable distance beyond the side portions of the beams 1. It is of course intended to have the ribs 12 and extending bar 14 concaved intermediate their ends to present the usual construction, thus permitting various articles, such for instance as barrels to be held upon the truck without danger of the same accidentally rolling from either side thereof.

The supporting blocks 15 are carried upon the lower surface of the angle irons 2 and these supporting blocks 15 are held in a fixed engagement with the angle irons 2 by the bolts 7, which also project through the blocks as illustrated clearly in Fig. 2. The axle bearings 16 are positioned upon the blocks 15 and carry the axle 17, the wheels 18 being positioned upon the projecting ends of the axle 17 to constitute a support for the front end of the truck.

From the foregoing description, it will be seen that the truck may be moved upwardly until the lip 4 engages a support and then the lip may be moved under a portion of the element to be carried upon the truck and then the operator may cause the elements to tilt or tip with a downward swinging movement of the rear end of the truck. The operator may grip the handles 3 and move the truck to any desired position, with the load thereon being carried by the ribs 12 and 13 and the bar 14, as well as the lip 4, in the usual manner.

The channel iron 19 is carried by the bolts 10 in engagement with the surface of the angle irons 2, at points adjacent the handles 3. A bearing plate 20 having a bearing sleeve 21 is bolted as shown at 22 to the plate 19. The bracket 23 has the usual stem as indicated at 24 projecting through the sleeve 21. An auxiliary wheel 25 is carried upon the bracket 23 and as the stem 24 is free to turn within the sleeve 21, it is obvious the auxiliary wheel 25 will be mounted upon a swivel, thus permitting the same to be easily swung, as the truck is changed in its course of movement.

Bracing bands 26 are positioned upon the lower portion of the channel iron 19 and the plate 20, as illustrated clearly in Fig. 2. It will be noted that the bands are positioned to engage the elements above referred to intermediate their ends, while the ends of the band are brought to bear upon the under surface of the angle irons 2. The bolts 8 are passed through a plurality of the ends of the band 26, thus anchoring the ends referred to, while the remaining ends of these bands are held in position by the bolts 11. Thus an efficient reinforcement is provided for the support of the auxiliary caster.

The angle iron 27 spans the distance between the rear ends of the beams 1 and are also held upon the angle iron 2 by the bolts 11. The retaining eyes 28 are connected in the usual manner to the angle iron 27, as illustrated clearly in Figs. 1 and 2 of the drawing. The connecting link 29 comprises a main body having diverging arms 30 extending therefrom and terminating in the rolled eyes 31. The eyes 31 engage the eyes 28, thus pivotally connecting the link 29 to the truck. The body also of this link 29 has a bent forward end 32, projecting at right angles to the body, and is provided with an abutment lug 33, at a point adjacent the hook or bent end 32. In connection with the connecting element for the trucks, attention is invited to Fig. 1, wherein the lip 4 is shown as having a central receiving opening 34.

From the foregoing description, it will be obvious that a truck is reinforced so as to efficiently retain an element positioned thereon against displacement while the arrangement of the caster wheels 18 permits the balancing of the element upon the truck, in such a manner as will permit a man to grip the handles and elevate the same to move the truck to any position desired. At this time the connecting link 29 will be depending, as illustrated in full lines in Fig. 1 and this engagement will not be in the way or will not interfere with manual transportation of the truck. When however, it is desired to use the truck in a train of trucks, the caster wheel 25 also engages the supporting surface, as do the caster wheels 18. At this time the connecting line 29 is swung to a substantially horizontal plane and the bent end 32 thereof is passed through the opening 34 formed in the lip 4 as shown in Fig. 2. Thus the truck will be connected to the next adjacent truck in the train, while another truck may be secured to the lip 4 of the truck just secured. Thus a number of trucks may be connected together and owing to the swivel mounting of the caster wheel 25, it is obvious the trucks may be swung so as to move in the direction the motive vehicle passes.

In practical experience, it has been found that the ordinary stevedore truck is too small to accommodate rapid handling of freight at various points and for this reason the usual four wheel motive trucks were connected to form a train. Owing to the raised construction of the platforms of these trucks, however, it has been found difficult to load and unload the same, requiring the services of several men for the positioning or the removal of elements upon or from the four wheel truck. In the present device, however, the truck is manipulated in the manner similar to the ordinary stevedore truck, that is by tilting the truck and inserting the lip thereof under the implement to be loaded thereon and then by the subsequent swinging of the truck downwardly to the position shown in Fig. 2. At this time the truck is connected to the truck in front, which is the next adjacent truck and it is obvious that motive power being applied to these trucks will move the same very rapidly, thus permitting the handling of considerable amount of freight with only the use of a comparatively small amount of labor.

Furthermore, the present invention discloses a trailer truck, simply by the provision of a third caster wheel in conjunction with the ordinary two wheel stevedore truck. Particular attention is invited to the fact that the openings 34 are formed to permit the bore to extend vertically when the trucks are resting on all of their casters, and for this reason the links of each truck may be very readily connected to the next adjacent truck, owing to the vertical arrangement of openings. It is also obvious that the present formation of a truck permits of the same to be connected in a train of trucks formed entirely of three wheel trucks illustrated in the drawing or of a train of four wheel trucks or by a train formed of the ordinary four wheel truck, together with the three wheel trucks herein illustrated. Under such conditions, it is obvious the four wheel trucks may be provided with a suitable connecting eye, thus permitting the link of the present three wheel truck to be connected to the four wheel truck for connecting these two forms of trucks together. Attention is also invited to the fact that when the links are disconnected from the adjacent trucks, they will swing downwardly to depend to a position which will not interfere with the gripping of the handle of the subsequent operation of the single truck.

By referring to Fig. 3 it will be noted that the truck may be tilted up to cause the lip 4 to be slipped under a load, as illustrated in dotted lines in Fig. 3 and then the article tilted over on the truck and then swung downwardly to rest upon the three wheels and be connected in a train of trucks or be moved independently as desired.

In order to facilitate the matter of understanding the manner in which the truck is connected in a train of trucks, attention is invited to Fig. 4. In Fig. 4 it will be seen that the three wheel truck is connected by its link 29 to the eye 35 secured to end of the four wheel truck 36. This four wheel truck may of course be provided with a link 29 at its forward end for allowing the four wheel truck to be connected to the suitable motor or tractor 37. Thus it will be seen that the trucks may be connected as hereinbefore specified in train of trucks composed or three wheel or of part three wheel and part four wheel trucks or in any other suitable manner desired or be used independently of each other owing to the releasable link connection used in this invention.

The foregoing description and the drawings have reference to what may be considered the preferred, or approved form of our invention. It is to be understood that we may make such changes in construction and arrangement and combination of parts, materials, dimensions, et cetera, as may prove expedient and fall within the scope of the appended claim.

What is claimed is:

The combination in a pair of hand trucks arranged for end to end connection, one of said trucks having a lip provided with an opening centrally arranged, a pair of eye bolts secured to the adjacent end of the other truck in spaced relation, a connecting member comprising three diverging arms, an eye formed upon each of two of said arms for interlinkage with the eye bolt, the other arm being bent and curved at right angle, an enlarged head on said bent end for insertion in the opening of the adjacent truck, and an abutment member extending substantially parallel to the bent portion and located adjacent the point of connection of the arm.

In testimony whereof we affix our signatures in presence of two witnesses.

HARRY B. LEVINSON.
WILL H. WESTFALL.

Witnesses:
WILLIAM L. FOWLER,
JOHN E. BURCH.